US011659136B2

(12) United States Patent
Yeh et al.

(10) Patent No.: US 11,659,136 B2
(45) Date of Patent: May 23, 2023

(54) DATA CONVERSION AND HIGH DEFINITION MULTIMEDIA INTERFACE RECEIVING DEVICE

(71) Applicant: REALTEK SEMICONDUCTOR CORPORATION, Hsinchu (TW)

(72) Inventors: Che-Wei Yeh, Hsinchu (TW); Chien-Hsun Lu, Hsinchu (TW); Zhan-Yao Gu, Hsinchu (TW); Chun-Chieh Chan, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/219,625

(22) Filed: Mar. 31, 2021

(65) Prior Publication Data

US 2022/0124282 A1  Apr. 21, 2022

(30) Foreign Application Priority Data

Oct. 19, 2020 (TW) ................................. 109136161

(51) Int. Cl.
  *H04N 7/01* (2006.01)
  *G09G 5/00* (2006.01)
  *H04N 5/765* (2006.01)

(52) U.S. Cl.
  CPC ........... *H04N 7/0125* (2013.01); *G09G 5/006* (2013.01); *H04N 5/765* (2013.01)

(58) Field of Classification Search
  CPC ....... H04N 7/0125; H04N 5/765; G09G 5/006
  See application file for complete search history.

(56) References Cited

U.S. PATENT DOCUMENTS

| 8,204,613 B2* | 6/2012 | Tung | H04N 21/4305 348/537 |
| 2009/0006882 A1* | 1/2009 | Manapragada | H04L 7/08 713/600 |
| 2009/0086089 A1* | 4/2009 | Matsui | H04N 7/015 348/E7.003 |
| 2011/0043707 A1* | 2/2011 | Umezu | H04N 21/43072 348/E5.093 |
| 2013/0027611 A1* | 1/2013 | Closset | H03L 7/087 348/E5.009 |

(Continued)

FOREIGN PATENT DOCUMENTS

| CN | 107197190 A | 9/2017 |
| TW | 201526628 A | 7/2015 |

OTHER PUBLICATIONS

Office Action, Cited References and Search Report dated Sep. 8, 2021 issued by the Taiwan Intellectual Property Office for the Taiwanese corresponding application No. 109136161.

*Primary Examiner* — John W Miller
*Assistant Examiner* — Sean N. Haiem
(74) *Attorney, Agent, or Firm* — WPAT, P.C., Intellectual Property Attorneys; Anthony King

(57) ABSTRACT

A data conversion device includes a storage circuit and a frequency tuning circuit. The storage circuit is configured to store a pixel data in a high definition multimedia interface (HDMI) signal according to a first clock, and output an image data according to a second clock. The frequency tuning circuit is configured to adjust the second clock according to a control signal and the second clock in the HDMI signal, and transmit the adjusted second clock to the storage circuit.

17 Claims, 2 Drawing Sheets

(56) References Cited

U.S. PATENT DOCUMENTS

| | | | |
|---|---|---|---|
| 2014/0205046 A1* | 7/2014 | Morikawa | G09G 5/006 |
| | | | 375/354 |
| 2015/0098527 A1* | 4/2015 | Wang | H03L 7/07 |
| | | | 375/316 |
| 2016/0021430 A1* | 1/2016 | LaBosco | H04N 21/43635 |
| | | | 725/31 |
| 2018/0293942 A1* | 10/2018 | Gu | G09G 3/2022 |

* cited by examiner

DATA CONVERSION AND HIGH DEFINITION MULTIMEDIA INTERFACE RECEIVING DEVICE

CROSS-REFERENCE TO RELATED APPLICATIONS

This application claims the benefit of priority to Patent Application No. 109136161, filed in Taiwan on Oct. 19, 2020, which is incorporated by reference in its entirety.

TECHNICAL FIELD

The present application relates to a data conversion device; in particular, a data conversion device that converts a high definition multimedia interface signal operated in a fixed clock domain into a pixel clock domain.

BACKGROUND

According to the definition of the high definition multimedia interface (HDMI) standard, after the HDMI signal transmitted by an HDMI transmitting device is received by the HDMI receiving device, the HDMI signal will be converted from the transmitting clock domain of the HDMI transmitting device into the receiving clock domain of the HDMI receiving device and sent to the display device. In order to avoid input overflow caused by excessive data received by the HDMI receiving device or output underflow due to excessive data output rates, how to adjust the receiving clock of the HDMI receiving device has become a critical issue of the related field.

SUMMARY OF THE INVENTION

Some embodiments of the present disclosure provide a data conversion device including a storage circuit and a frequency tuning circuit. The storage circuit is configured to store a pixel data in a high definition multimedia interface (HDMI) signal according to a first clock, and output an image data according to a second clock. The frequency tuning circuit is configured to adjust the second clock according to a control signal and the second clock in the HDMI signal, and transmit the adjusted second clock to the storage circuit.

Some embodiments of the present disclosure provide a HDMI receiving device including a decoding device and a data conversion device. The decoding device is configured to receive a HDMI signal to generate a first control signal and a pixel data operated in a clock domain of a first clock. The data conversion device is configured to receive the first clock, the first control signal and the pixel data, and generate a second control signal and an image data operated in a clock domain of a second clock. The data conversion device adjusts the second clock according to the first control signal and the second clock.

Compared to conventional arts, the data conversion and the HDMI receiving device of the present disclosure can adjust pixel clock timely and output the image data effectively according to the pixel clock valid, thereby avoiding the input overflow or output underflow of the HDMI receiving device.

DETAILED DESCRIPTION

Figure 1:
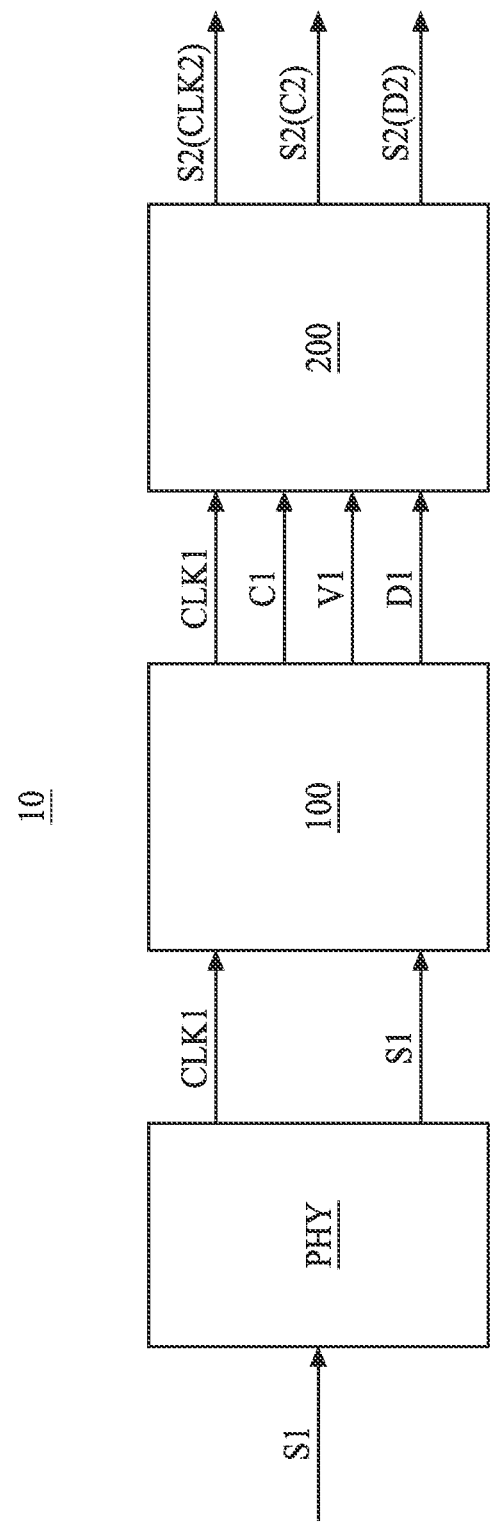
FIG. 1 is a schematic diagram illustrating a high definition multimedia interface (HDMI) receiving device according to some embodiments of the present application.

FIG. 1 is a schematic diagram illustrating an HDMI receiving device 10. The HDMI receiving device 10 is configured to receive an HDMI signal S1 transmitted from an HDMI transmitting device (not shown in the figure) and convert the HDMI signal S1 into an image signal S2 and output the image signal S2. The HDMI signal S1 includes a fixed rate link (FRL) clock CLK1, a pixel data D1 and a control signal C1, and an image signal S2 includes a pixel clock CLK2, an image data D2 and a control signal C2. In some embodiments, the pixel data D1 and image data D2 are RGB data.

The HDMI receiving device 10 includes a physical layer device PHY, a decoding device 100 and a data conversion device 200. The physical layer device PHY is configured to receive the HDMI signal S1 and obtain the FRL clock CLK1 through the clock data recovery circuit of the physical layer device PHY. The physical layer device PHY transmits the FRL clock CLK1 and the HDMI signal S1 to the decoding device 100. The decoding device 100 decodes the HDMI signal S1 into a control signal C1, a data valid signal V1 and a pixel data D1.

The data conversion device 200 receives the FRL clock CLK1, the control signal C1, the data valid signal V1 and the pixel data D1, and outputs the pixel clock CLK2, the image data D2 and the control signal C2. The image data D2 and the control signal C2 belong to the clock domain of the pixel clock CLK2. The data conversion device 200 is configured to store the pixel data D1 according to the FRL clock CLK1, and output the image data D2 according to the pixel clock CLK2. The data conversion device 200 is configured to adjust the pixel clock CLK2, so that the image data D2 and the control signal C2 can be outputted at different times according to different pixel clocks CLK2.

In some embodiments, data conversion device 200 has a first-in-first-out (FIFO) register, which is configured to store the pixel data D1 received and sequentially output pixel data D1 in the FIFO register as the image data D2 according to the pixel clock CLK2.

However, the storage of the FIFO register is nevertheless limited. In some conventional arts, the HDMI receiving device cannot effectively adjust the pixel clock, so that when the speed at which the HDMI receiving device outputs the image data is slower than the speed that it stores the pixel data, the FIFO register can experience an overflow because the pixel data it stores is more than the image data it outputs. Alternatively, when the speed at which the HDMI receiving device outputs the image data is greater than the speed that it stores the pixel data, the FIFO register can experience an underflow because the image data it outputs is more than the pixel data it stores.

Compared with conventional arts, the data conversion device 200 and the HDMI receiving device 10 according to the present application can avoid the foregoing overflow or underflow by more effectively adjusting the function of pixel clock CLK2. Detail discussion is provided below.

Figure 2:
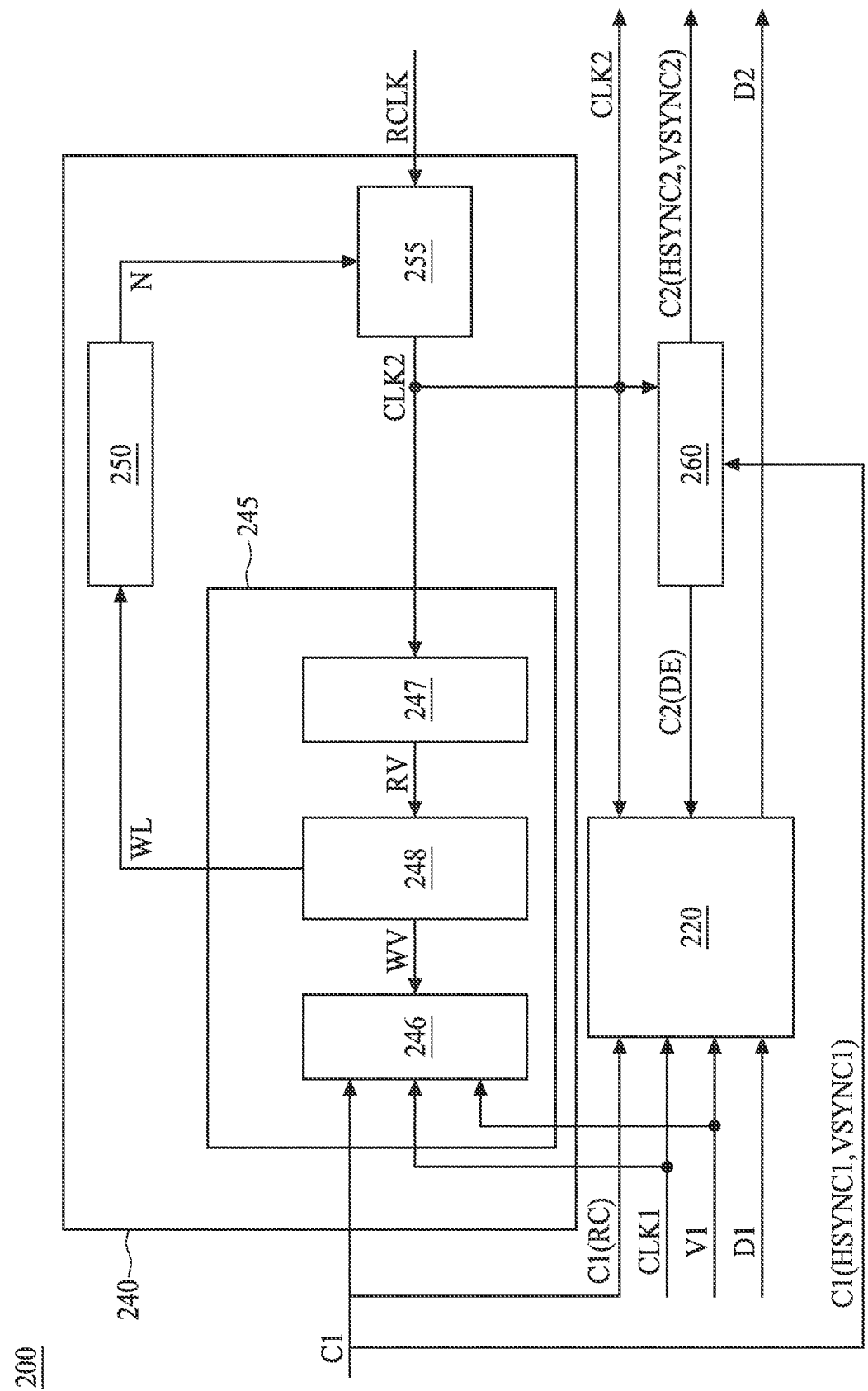
FIG. 2 is a schematic diagram illustrating a data conversion device of the HDMI receiving device according to some embodiments of the present application.

Referring to FIG. 2. FIG. 2 is a schematic diagram illustrating a data conversion device 200 according to some embodiments of the present application. The data conversion device 200 includes a storage circuit 220, a frequency tuning circuit 240 and a format generation circuit 260.

In some embodiments, the storage circuit 220 includes an FIFO register. The storage circuit 220 stores the pixel data D1 according to the FRL clock CLK1, the data compression ratio signal RC in the control signal C1 and data valid signal V1. In some embodiments, when the data valid signal V1 corresponds to a first level, it means that the storage circuit 220 receives a valid pixel data D1; in this case, the storage circuit 220 stores the received pixel data D1. In contrast, when the data valid signal V1 corresponds to a second level (different from the first level), it means that the storage circuit 220 receives an invalid pixel data D1, such as a gap character; in this case, the storage circuit 220 does not perform the storage operation.

The storage circuit 220 outputs the image data D2 according to the pixel clock CLK2. In other words, the outputted image data D2 belongs to a clock domain of the pixel clock CLK2. The frequency tuning circuit 240 is configured to generate a pixel clock CLK2 and adjust the pixel clock CLK2 in real-time. Specifically, the frequency tuning circuit 240 adjusts the pixel clock CLK2 according to the accumulated volume of the pixel data D1 stored by the storage circuit 220 and the accumulated volume of the outputted image data D2. The format generation circuit 260 generates a control signal C2 according to the pixel clock CLK2 and the control signal C1, and transmits the control signal C2 to the storage circuit 220, so that the storage circuit 220 outputs the image data D2 according to the control signal C2 (which is generated according to the pixel clock CLK2).

In some embodiments, the frequency tuning circuit 240 includes a data calculator 245, a frequency setting unit 250 and a phase-locked loop 255. The data calculator 245 generates a water level value WL according to the control signal C1, the data valid signal V1, the FRL clock CLK1 and the pixel clock CLK2, wherein the water level value WL represents the difference between the accumulated volume of the pixel data D1 stored by the storage circuit 220 and the accumulated volume of the outputted image data D2. The frequency setting unit 250 generates a clock control signal N according to the water level value WL. The phase-locked loop 255 generates the pixel clock CLK2 according to the clock control signal N and the reference clock RCLK. For example, the clock control signal N is a frequency-division ratio of the phase-locked loop 255.

In some embodiments, the data calculator 245 includes a write pointer unit 246, a read pointer unit 247 and an error generator 248. In some embodiments, the write pointer unit 246 and the read pointer unit 247 are pointer registers, configured to indicate the address in the storage circuit 220. For example, the write pointer unit 246 and the read pointer unit 247 can be implemented by program counters, which are also referred to as address registers. The write pointer unit 246 is configured to indicate a write value WV according to the control signal C1, the data valid signal V1, the FRL clock CLK1, wherein the write value WV represents the address in the storage circuit 220 where the latest stored pixel data D1 is stored, and the read pointer unit 247 is configured to indicate read value RV according to the pixel clock CLK2, wherein the read value RV represents the address in the storage circuit 220 where the latest output image data D2 was originally stored. The error generator 248 generates a water level value WL according to the write value WV and the read value RV. The above-mentioned write pointer unit 246 and read pointer unit 247 are for illustrative purpose only, and various write pointer units 246 and read pointer units 247 are also within the consideration and scope of the present application. For example, the write pointer unit 246 and the read pointer unit 247 can be implemented using accumulators.

In some embodiments, the storage circuit 220 store the pixel data D1 according to the data compression ratio signal RC in the control signal C1, the data valid signal V1 and the FRL clock CLK1, whereas the write pointer unit 246 determines the volume of the pixel data D1 that is received by the storage circuit 220 after the pixel data D1 has been restored according to the data compression ratio signal RC, the data valid signal V1 and the FRL clock CLK1. For example, (approximately) 3 Bytes of data are processed during one FRL clock CLK1 cycle, when the data compression ratio signal RC indicates that a six-fold of data volume is to be processed during the FRL clock signal CLK1 cycle being received, and the data valid signal V1 indicate that 3 Bytes data received in the cycle is valid, it means that during this cycle, the restored (decompressed) pixel data D1 includes a data volume that is 6-fold of 3 Bytes; therefore, the storage circuit 220 have to store 18 Bytes (6*3 Bytes*1) of data (or (6+1)*3 Bytes when it is a case to repeat 6 times in HDMI standard); in this way, the write pointer unit 246 indicates that the address can move forward by 18 (or 21) Bytes from the current address in the storage circuit 220, wherein the data valid signal V1 corresponding to 1 indicates that, the data received during this cycle is valid. The address is the write value WV. For example, when the data valid signal V1 corresponds to 0, it means that the data received during this cycle is invalid.

In contrast, since the data stored in the storage circuit 220 are all valid data, the read pointer unit 247 only has to determines the volume of the image data D2 that is outputted by the storage circuit 220 according to the pixel clock CLK2 and indicate the address of the most recent outputted image data D2 in the storage circuit 220. The address is a read value RV.

Because the storage circuit 220 stores pixel data D1 sequentially (as discussed above, it includes a FIFO register), a difference between the accumulated volume of the stored pixel data D1 and the accumulated volume of the outputted image data D2 can be used to obtain a difference between the address in the storage circuit 220. Specifically, the error generator 248 reads the write value WV and the read value RV, and subtracts the read value RV from the write value WV to obtain the water level value WL. Because the write value WV is updated in real-time depending on the pixel data D1, the data compression ratio signal RC, the data valid signal V1 and the FRL clock CLK1, and the read value RV is updated in real-time depending on the pixel clock CLK2, the water level value WL can simulate the volume of the data that has been stored in the storage circuit 220 but has not been outputted yet.

When the water level value WL is greater than a predetermined upper limit, the frequency setting unit 250 generates a clock control signal N, so that the phase-locked loop 255 increases the frequency of the pixel clock CLK2 according to the clock control signal N; for example, it increases the clock control signal N, so as to increase the output speed of the storage circuit 220. When the water level value WL is smaller than a predetermined lower limit, the frequency setting unit 250 generates a clock control signal N, so that the phase-locked loop 255 decreases the frequency of the pixel clock CLK2 according to the clock control signal N; for example, it decreases the clock control signal N, so as to reduce the output speed of the storage circuit 220. In other words, the frequency tuning circuit 240 is configured to adjust the pixel clock CLK2 according to a difference between the accumulated volume of the stored pixel data D1 and the accumulated volume of the outputted image data D2, so that for the pixel data D1 in the storage circuit 220 that has not been outputted as the image data D2, it takes up a storage volume in the storage circuit 220 in a range between the predetermined upper limit and the predetermined lower limit. In some embodiments, the predetermined upper limit corresponds to about 70% of the storage volume in the storage circuit 220 (i.e., with a tolerance of 30% for the overflow to take place). In some embodiments, the predetermined lower limit corresponds to about 30% of the storage volume in the storage circuit 220 (i.e., with a tolerance of 30% for the underflow to take place).

In some embodiments, the control signal C1 further includes a horizontal synchronization signal HSYNC1 and a vertical synchronization signal VSYNC1. The horizontal synchronization signal HSYNC1 indicates the beginning of each scan line in a frame under the clock domain of the FRL clock CLK1, and the vertical synchronization signal VSYNC1 indicates the first scan line of each frame under the clock domain of the FRL clock CLK1. The control signal C2 includes an enabling signal DE, a horizontal synchronization signal HSYNC2 and a vertical synchronization signal VSYNC2, wherein the horizontal synchronization signal HSYNC2 and the vertical synchronization signal VSYNC2 indicate the beginning of each scan line of a frame and the first scan line of each frame under the clock domain of the pixel clock CLK2, respectively. The format generation circuit 260 converts the horizontal synchronization signal HSYNC1 and the vertical synchronization signal VSYNC1 from the clock domain of the FRL clock signal CLK1 into the clock domain of the pixel clock signal CLK2 and outputs the same as the horizontal synchronization signal HSYNC2 and the vertical synchronization signal VSYNC2. Specifically, the format generation circuit 260 can obtain the data volume of one frame according to the cycle number of the FRL clock CLK1 between each horizontal synchronization signal HSYNC1 and the number of the vertical synchronization signal VSYNC1, and then convert the horizontal synchronization signal HSYNC1 and vertical synchronization signal VSYNC1 operated under the clock domain of the FRL clock CLK1 into the horizontal synchronization signal HSYNC2 and the vertical synchronization signal VSYNC2 operated under the clock domain of the pixel clock CLK2 and output the same, and generates an enabling signal DE to the storage circuit 220 according to the pixel clock CLK2, the horizontal synchronization signal HSYNC2 and the vertical synchronization signal VSYNC2. In some embodiments, the format generation circuit 260 includes a counter configured to count the number of the horizontal synchronization signal HSYNC2 and the vertical synchronization signal VSYNC2 generated. After the first scan line in one frame indicated by the vertical synchronization signal VSYNC2 starts scanning, the format generation circuit 260 generates an enabling signal DE when each scan line indicated by the horizontal synchronization signal HSYNC2 starts scanning. In other words, each scan line stored in the storage circuit 220 corresponds to one enabling signal DE. Therefore, after the storage circuit 220 receives the enabling signal DE, it can output the image data D2 corresponding to the scan line according to the pixel clock CLK2.

What is claimed is:

1. A data conversion device, comprising:
    a storage circuit, configured to store a pixel data in a high definition multimedia interface (HDMI) signal according to a first clock, and output an image data according to a second clock; and
    a frequency tuning circuit, configured to dynamically adjust the second clock according to a control signal in the HDMI signal and the second clock, and transmit the adjusted second clock to the storage circuit,
    wherein the control signal is associated with an accumulated volume of the pixel data being stored by the store circuit,
    wherein the frequency tuning circuit comprises:
        a data calculator, configured to output a water level value according to the first clock, the control signal and the second clock; and
        a phase-locked loop, configured to output the second clock according to the water level value.

2. The data conversion device of claim 1, wherein the water level value represents a difference between the accumulated volume of the pixel data stored by the storage circuit and an accumulated volume of the outputted image data.

3. The data conversion device of claim 1, wherein the data calculator comprising:
    a write pointer unit, configured to indicate a write value according to the control signal, wherein the write value represents an accumulated volume of the pixel data received by the storage circuit.

4. The data conversion device of claim 3, wherein the write pointer unit is further configured to update the write value according to a data valid signal and a data compression ratio signal in the control signal.

5. The data conversion device of claim 4, wherein,
    when the data valid signal indicates that the pixel data received by the storage circuit is valid, the write pointer unit updates the write value according to the data compression ratio signal; and
    when the data valid signal indicates that the pixel data received by the storage circuit is invalid, the write pointer unit does not update the write value.

6. The data conversion device of claim 3, wherein the data calculator further comprises:
    a read pointer unit, configured to indicate a read value according to the second clock, wherein the read value represents an accumulated volume of the image data outputted by the storage circuit.

7. The data conversion device of claim 6, wherein the data calculator further comprises:
    an error generator, configured to generate the water level value according to the write value and the read value, wherein the water level value is obtained by subtracting the read value from the write value.

8. The data conversion device of claim 1, wherein the frequency tuning circuit further comprises:
    a frequency setting unit, configured to generate a clock control signal to the phase-locked loop according to the water level value, wherein the phase-locked loop outputs the second clock according to the clock control signal and a reference clock.

9. The data conversion device of claim 8, wherein
    when the water level value is greater than a predetermined upper limit, the frequency setting unit generates the clock control signal so that the phase-locked loop increases the frequency of the second clock; and
    when the water level value is smaller than a predetermined lower limit, the frequency setting unit generates the clock control signal so that the phase-locked loop decreases the frequency of the second clock.

10. The data conversion device of claim 1, further comprising:

a format generation circuit, configured to generate an enabling signal to the storage circuit according to the second clock and the control signal, wherein the storage circuit further outputs the image data according to the enabling signal and the second clock.

11. The data conversion device of claim 10, wherein the format generation circuit is configured to generate a second vertical synchronization signal and a second horizontal synchronization signal according to the second clock and a first vertical synchronization signal and a first horizontal synchronization signal in the control signal, and then generate the enabling signal according to the second clock, the second vertical synchronization signal and the second horizontal synchronization signal.

12. A high definition multimedia interface (HDMI) receiving device, comprising:
   a decoding device, configured to receive a HDMI signal to generate a first control signal and a pixel data operated in a clock domain of a first clock; and
   a data conversion device, configured to receive the first clock, the first control signal and the pixel data, and generate a second control signal and an image data operated in a clock domain of a second clock, wherein the data conversion device dynamically adjusts the second clock according to the first control signal and the second clock,
   wherein the control signal is associated with an accumulated volume of the pixel data being stored by a storage circuit of the data conversion device,
   wherein the data conversion device comprises:
      a frequency tuning circuit, configured to adjust the second clock according to a data compression ratio signal in the first control signal and the second clock; and
      the storage circuit, configured to store the pixel data, and output the image data according to the second clock,
   wherein the frequency tuning circuit comprises:
      a data calculator, configured to generate a water level value according to the data compression ratio signal and the second clock;
      a frequency setting unit, configured to generate a clock control signal according to the water level value; and
      a phase-locked loop, configured to adjust the second clock according to the clock control signal and a reference clock,
   wherein the water level value represents a difference between the accumulated volume of the pixel data stored by the storage circuit and an accumulated volume of the outputted image data.

13. The HDMI receiving device of claim 12, wherein the data conversion device further comprises:
   a format generation circuit, configured to convert the first control signal into the second control signal according to the second clock.

14. The HDMI receiving device of claim 12 wherein the data calculator comprises:
   a write pointer unit, configured to indicate a write value according to the data compression ratio signal;
   a read pointer unit, configured to indicate a read value according to the second clock signal; and
   an error generator, configured to generate the water level value, wherein the water level value is obtained by subtracting the read value from the write value.

15. The HDMI receiving device of claim 14, wherein the write value represents an accumulated volume of the pixel data received by the storage circuit, and the read value represents an accumulated volume of the image data outputted by the storage circuit.

16. The HDMI receiving device of claim 14, wherein the decoding device further configured to generate a data valid signal operated in a clock domain of the first clock, and
   wherein the write pointer unit is further configured to indicate the write value according to the data valid signal, wherein when the data valid signal indicates that the pixel data received by the storage circuit is valid, the write pointer unit updates the write value according to the data compression ratio signal, and when the data valid signal indicates that the pixel data received by the storage circuit is invalid, the write pointer unit does not update the write value.

17. The HDMI receiving device of claim 12, wherein when the water level value is greater than a predetermined upper limit, the frequency setting unit generates the clock control signal so that the phase-locked loop increases the frequency of the second clock, and when the water level value is smaller than a predetermined lower limit, the frequency setting unit generates the clock control signal so that the phase-locked loop decreases the frequency of the second clock.

* * * * *